(12) United States Patent
Rohloff et al.

(10) Patent No.: US 10,105,648 B2
(45) Date of Patent: Oct. 23, 2018

(54) METHOD FOR DECREASING AN AMOUNT OF A HARMFUL SUBSTANCE OF AN OFF-GAS STREAM FORMED OR USED IN A THERMAL TREATMENT OF A MATERIAL

(71) Applicants: THYSSENKRUPP AG, Essen (DE); THYSSENKRUPP INDUSTRIAL SOLUTIONS AG, Essen (DE)

(72) Inventors: Kathrin Rohloff, Warendorf (DE); Timo Stender, Froendenberg (DE)

(73) Assignees: THYSSENKRUPP INDUSTRIAL SOLUTIONS AG, Essen (DE); THYSSENKRUPP AG, Essen (DE)

(*) Notice: Subject to any disclaimer, the term of this patent is extended or adjusted under 35 U.S.C. 154(b) by 329 days.

(21) Appl. No.: 14/933,431

(22) Filed: Nov. 5, 2015

(65) Prior Publication Data
US 2016/0129393 A1    May 12, 2016

(30) Foreign Application Priority Data
Nov. 12, 2014  (DE) .................... 10 2014 116 532

(51) Int. Cl.
*B01D 53/75*    (2006.01)
*B01D 53/96*    (2006.01)
(Continued)

(52) U.S. Cl.
CPC ............. *B01D 53/75* (2013.01); *B01D 53/50* (2013.01); *B01D 53/502* (2013.01); *B01D 53/64* (2013.01);
(Continued)

(58) Field of Classification Search
CPC ........ B01D 53/50; B01D 53/96; B01D 53/75; B01D 53/502; B01D 53/64;
(Continued)

(56) References Cited

U.S. PATENT DOCUMENTS 5,209,774 A    5/1993   Rockandel et al.
5,365,866 A *  11/1994  Von Seebach .......... C04B 7/364
                                                        110/259
(Continued)

FOREIGN PATENT DOCUMENTS

CA    2707381 A1 * 12/2010 ............. B01D 53/64
DE    69303930 T2    3/1997
(Continued)

OTHER PUBLICATIONS

English Language Abstract for JP2007031188, dated 2007.
English Language Abstract for JP2012187458, dated 2012.
English Language Abstract for JP2010076973, dated 2010.

*Primary Examiner* — Timothy C Vanoy
(74) *Attorney, Agent, or Firm* — thyssenkrupp North America, Inc.

(57) ABSTRACT

A method for decreasing an amount of a harmful substance of a chlorine-containing off-gas stream formed or used in a thermal treatment of a material may comprise dividing the chlorine-containing off-gas stream into a main stream and a substream, separating at least some chlorine from the main stream, lowering an amount of the harmful substance in the main stream by introducing a chlorine-containing additive into the main stream to enhance separation of the harmful substance, and filtering the substream such that a filter cake separated from the substream comprises at least part of the chlorine-containing additive.

15 Claims, 1 Drawing Sheet

(51) Int. Cl.
  *B01D 53/64* (2006.01)
  *B01D 53/50* (2006.01)
  *C04B 7/36* (2006.01)

(52) U.S. Cl.
  CPC .............. *B01D 53/96* (2013.01); *C04B 7/364* (2013.01); *B01D 2257/2025* (2013.01); *B01D 2257/302* (2013.01); *B01D 2257/602* (2013.01); *B01D 2258/0233* (2013.01)

(58) Field of Classification Search
  CPC ...... B01D 2257/2025; B01D 2257/302; B01D 2257/602; B01D 2258/0233; C04B 7/364; C04B 7/365
  See application file for complete search history.

(56) References Cited

U.S. PATENT DOCUMENTS

| | | | |
|---|---|---|---|
| 7,955,417 B2 * | 6/2011 | Ichihara | B01D 53/10 95/107 |
| 9,823,020 B2 * | 11/2017 | Sakaniwa | B01D 53/68 |
| 2002/0083831 A1 * | 7/2002 | Jorget | B01D 46/10 95/57 |
| 2007/0098035 A1 | 5/2007 | Shinichiro et al. | |
| 2013/0192497 A1 | 8/2013 | Terasaki | |
| 2013/0202514 A1 | 8/2013 | Saito et al. | |
| 2014/0109800 A1 | 4/2014 | Zurhove | |
| 2016/0279569 A1 * | 9/2016 | Stender | B01D 53/8656 |

FOREIGN PATENT DOCUMENTS

| | | | | |
|---|---|---|---|---|
| DE | 102011001933 B4 | | 10/2012 | |
| EP | 2604586 A1 | * | 6/2013 | ............ C04B 7/436 |
| JP | 2007031188 A | * | 2/2007 | ............ B01D 53/50 |
| JP | 2010 076973 A | * | 4/2010 | ............ B01D 53/64 |
| JP | 2010076973 A | | 4/2010 | |
| JP | 2012 188322 A | * | 10/2012 | ............... C04B 7/60 |
| JP | 2012187458 A | * | 10/2012 | ........... B01D 53/501 |
| KR | 20020076065 A | * | 10/2002 | ............... C04B 7/60 |
| WO | WO 2017 005724 A1 | * | 1/2017 | ............... C04B 7/60 |
| WO | WO 2017 024247 A1 | * | 2/2017 | ........... B01D 53/508 |

* cited by examiner

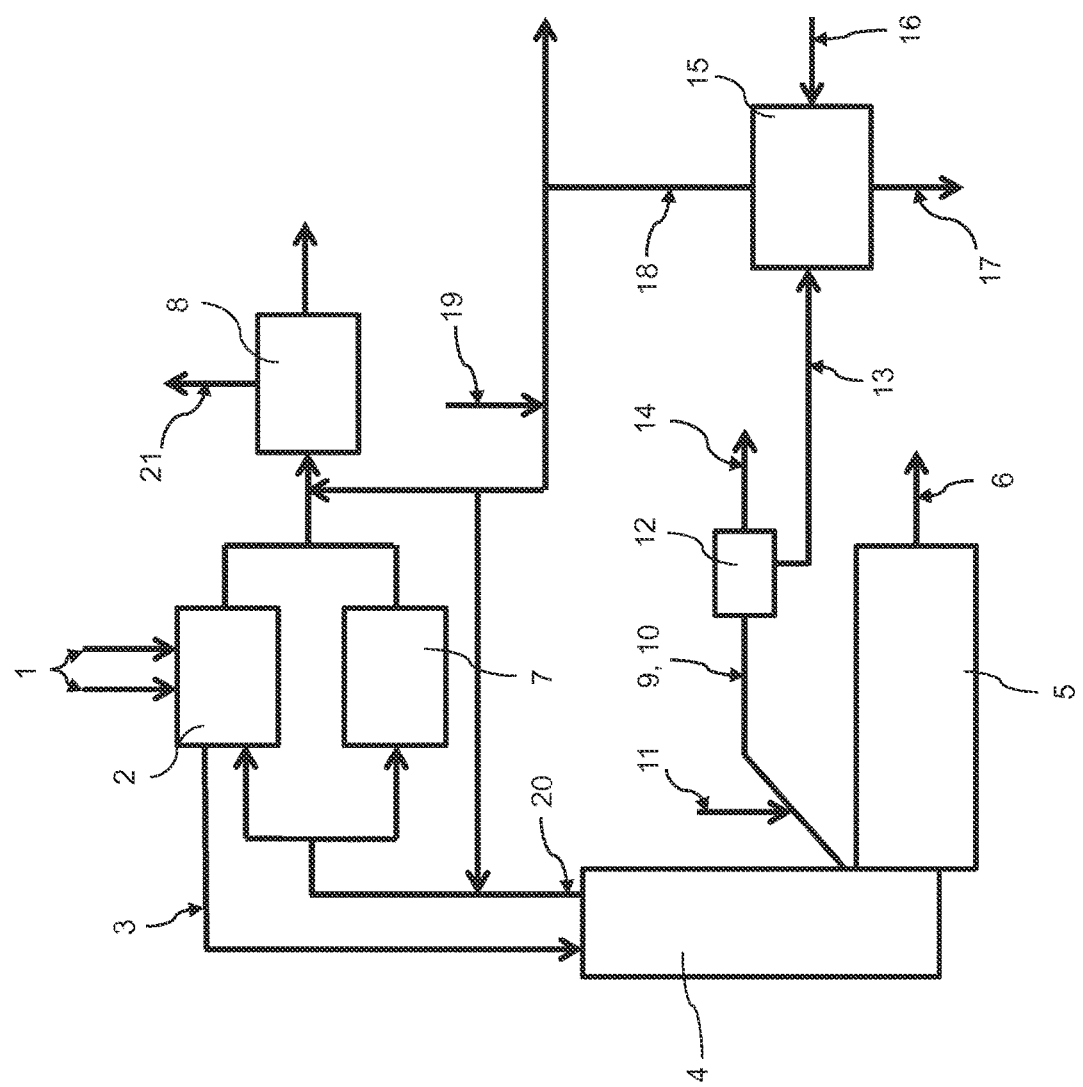

METHOD FOR DECREASING AN AMOUNT OF A HARMFUL SUBSTANCE OF AN OFF-GAS STREAM FORMED OR USED IN A THERMAL TREATMENT OF A MATERIAL

CROSS-REFERENCE TO RELATED APPLICATIONS

This application claims priority to prior filed German Patent Application Serial No. 102014116532.2 filed Nov. 12, 2014, the entire contents of which are hereby incorporated by reference herein.

FIELD

The invention relates to a method for decreasing an amount of a harmful substance of an off-gas stream formed or used in a thermal treatment of a material. In particular, the invention relates to a method for decreasing the sulphur and/or mercury content of an off-gas formed in cement production.

BACKGROUND

It is known that sulphur can be decreased in off-gases of the cement industry by spraying in lime-containing sorbents such as, for example, calcium hydroxide. The lime-containing sorbents are sprayed into the off-gas stream, react there with sulphur dioxide and sulphur trioxide of the off-gas to form calcium sulphite and calcium sulphate, which are then incorporated into the kiln meal in the preheater or are separated off at a filter. For this purpose, a defined residence time and sufficient mixing are required. In addition, the off-gas temperature, the off-gas moisture and the concentration of chlorine in the off-gas are critical for high degrees of separation. This is because chlorine has hygroscopic properties and can thereby increase the degree of separation for calcium sulphite and calcium sulphate.

In the context of the production of cement, in addition, sulphur can be incorporated in the raw material in the raw mill. Here also, the incorporation can be increased by an increase in the chlorine concentration.

Introduction of chlorine into off-gases of the cement industry in addition enables separation of mercury to be increased. By oxidation of elemental mercury to mercury chloride, in particular the tendency to adsorption to solid particles, such as filter dust, raw meal or other sorbents, can be increased.

In the off-gases exiting from a (kiln meal) preheater of a cement production plant, generally no chlorine is present, since the chlorine liberated in the clinker kiln at high temperatures is already reincorporated in the preheater downstream of the clinker kiln in the direction of flow of the off-gas. As a result, a chlorine circuit between clinker kiln and preheater is developed which could lead to a continuous increase in the chlorine content. In order to relieve this chlorine circuit, an off-gas bypass is regularly provided in the clinker kiln exhaust, that is to say in the region of the transition between clinker kiln and preheater. Via the off-gas bypass, a substream of the off-gas stream is branched off and then quenched and dedusted at a filter. In this case, the chlorine present is virtually completely incorporated into the bypass dust occurring in the filter. The loaded bypass dust generally is to be ejected from the cement production process on account of the contamination with chlorine and other harmful substances, such as, for example, alkali metals and heavy metals. Treatment of the bypass dust in this case becomes of importance to many operators of cement plants, since, in addition to a loss of material, they give rise to disposal costs.

The bypass dust can be treated in the form of a washing using chemical and mechanical stages. Harmful substances such as, for example, chlorine and heavy metals in this case are removed in various stages from the bypass dust. Processes for treating bypass dust are published, for example, in WO 2012/142638 A1 and WO 2013/113664 A1.

SUMMARY

The object of the present disclosure is to decrease in the most advantageous way possible an amount of a harmful substance in an off-gas formed in production of cement. This object may be achieved, for example, by the various methods set forth in the claims. Advantageous embodiments thereof are subjects of the further claims and result from the description of the invention hereinafter.

A method according to the invention for decreasing an amount of a harmful substance of an off-gas stream formed or used in a thermal treatment of a material, by separating off the harmful substance (or an off-gas constituent comprising the harmful substance), in which the chlorine-containing off-gas stream is divided into a main stream and a substream, at least some of the chlorine is separated off from the off-gas of the main stream, and an amount of the harmful substance is then lowered in the main stream by separation, wherein a chlorine-containing additive is introduced into the main stream in order to achieve an increase in the degree of separation in the separation of the harmful substance, is characterized in that the substream, preferably after quenching, is filtered, wherein a filter cake separated from the substream in the filtration is fed back at least in part to the cooled main stream as chlorine-containing additive.

The expressions "substream" and "main stream" need not necessarily be interpreted to the effect that the quantitative stream of the substream is smaller than that of the main stream of the off-gas.

The substream is branched off preferably at a temperature of the off-gas at which the chlorine in the off-gas is still present as far as possible in the gaseous state.

The expression "filtering" is intended according to the invention to comprise all separation processes via which at least one constituent and, in particular, particles can be separated off from the off-gas. The filtering can be based, in particular, on a screening effect and/or on inertia of the particles that are to be filtered out. The expression "filter cake" is to designate according to the invention in general the constituent separated off from the off-gas.

The separation of the chlorine from the main stream can result in particular from a cooling of the main stream proceeding in the context of the thermal treatment of the material. In this case, the chlorine can be incorporated, in particular, into the material.

A separation of the harmful substance can proceed preferably by means of a (single- or multistage) off-gas filter. Introduction of the chlorine-containing additive to the main stream of the off-gas stream then proceeds upstream of the off-gas filter. A filter cake that is produced in the off-gas filter is preferably at least in part ejected.

The process according to the invention permits chlorine, which is present in the substream to a relevant extent, since said substream is itself branched off upstream of the cooling of the main stream and the separation caused thereby of the chlorine on, in particular, the material that is to be thermally treated, to be used to reinforce the decrease in harmful substance of the off-gas that has been cooled (and therefore comprising no chlorine, or only little chlorine). The (preferably provided) quenching and filtering of the off-gas of the substream serves in this case to concentrate the chlorine or the chlorine-containing constituents of the substream of the off-gas stream.

In a preferred embodiment of the method according to the invention, this process can serve (inter alia) for decreasing the sulphur content of the off-gas stream. For this purpose, it can be provided that a reaction of sulphur dioxide and/or sulphur trioxide in the off-gas stream to form calcium sulphite and/or calcium sulphate is permitted by introducing a calcium-containing additive into the main stream, and then the calcium sulphite and/or calcium sulphate is separated off from the main stream wherein the increase of the chlorine content achieved according to the invention in the off-gas increases the separation rate for the calcium sulphite and/or the calcium sulphate. As calcium-containing additive, preferably a calcium-containing sorbent such as, for example, calcium hydroxide, can be utilized.

A filter cake that comprises the harmful substance and is separated at the off-gas filter can be reused in whole or in part in order to utilize still unreacted calcium-containing additive and thereby increase the efficiency of the method. This reused (part of the) filter cake then also comprises at least a part of the chlorine-containing additive which can thus likewise be reused. As a result, the amount of chlorine-containing additive to be used can be kept low.

In a preferred embodiment of the method according to the invention, said method can serve (inter alia) for decreasing the mercury content of the off-gas stream. In this case, via the introduction of the chlorine-containing additive, a reaction of mercury to form mercury chloride can be effected. As a result, a separation rate in a subsequent separation of the mercury chloride from the main stream can be increased.

A preferred application of the method according to the invention is in the treatment of off-gas which is formed in the production of cement. In this case, it is possible to provide that, in the context of cement clinker production (as a partial step in the production of cement), kiln meal is preheated and fired to form the cement clinker, wherein (at least) one main stream of an off-gas stream which is to be decreased with respect to the harmful substance content and is formed during the firing of the cement clinker is used for preheating (and optionally also calcination) of the kiln meal. As a result of the preheating of the kiln meal which, for example, can proceed in a cyclone preheater connected upstream of a clinker kiln which is known in principle, the off-gas is cooled, which leads to an at least partial, in particular substantial, separation of the chlorine and incorporation in the kiln meal. By feeding the chlorine-containing additive obtained from the substream of the off-gas stream that is branched off (and conducted in what is termed the off-gas bypass), the chlorine content can be increased in the off-gas of the main stream downstream of the preheating of the kiln meal, and thereby a separation rate for harmful substances, in particular sulphur and/or mercury, can be increased.

In addition, it can be provided that, in the context of cement clinker production, one or more raw materials are processed (and in particular ground) to form the kiln meal, wherein a main stream of an off-gas stream which is to be decreased with respect to the harmful substance content is used for drying the raw materials in the context of the processing to form the kiln meal. Here also, by feeding the chlorine-containing additive obtained from the substream of the off-gas stream, the chlorine content in the main stream utilized for the drying and thereby a degree of separation for harmful substances, in particular sulphur and/or mercury, and incorporation thereof into the raw materials or the kiln meal can be increased.

The increase according to the invention of the chlorine content in the off-gas stream can be advantageous in particular in a combination of the method according to the invention in which at least a part of the main stream of the off-gas stream that is formed during the firing of the cement clinker and utilized for preheating the kiln meal is additionally utilized for drying the raw materials, because then the main stream also utilized for drying the raw materials, owing to the cooling in the preheating of the kiln meal and the separation resulting therefrom of the previously present chlorine, would fundamentally (i.e. without the introduction according to the invention of a chlorine-containing part of the substream of the off-gas stream) have an only very low chlorine concentration.

In addition to an application of the method according to the invention in the context of cement production, other applications are also possible, in particular in the fields of the lime and mineral industries.

In an embodiment of the method according to the invention, it can be provided that the filter cake produced during the filtration of the substream of the off-gas stream is separated into a fine fraction and a coarse fraction, wherein the fine fraction is fed at least in part back to the main stream of the off-gas stream. As a result, it is possible to exploit the fact that chlorine and also other harmful substances are primarily present in fine fractions of dust present in the substream of the off-gas stream. Therefore, a further concentration of the chlorine can be achieved by the separation. The separation of the filter cake can proceed not only in the context of the filtration itself, but also thereafter. The separation of the filter cake into fine and coarse fractions can proceed, for example, after a typical dry dedusting stage by sifting the entire substream of the off-gas stream. Separation of the fractions can also proceed in different filters or filter chambers. For example, a cyclone and/or an electrostatic precipitator for separating off the coarse fraction can be provided in an off-gas bypass provided for conducting the substream of the off-gas stream, which cyclone and/or electrostatic precipitator is followed, in the direction of flow of the substream, by a wet filter for separating off the fine fraction. In addition, a plurality of separators can also be operated in differing temperature ranges. After a separation of the coarse fraction, the temperature can be lowered for the subsequent separation of the fine fraction.

Separation of chlorine in the context of filtration of the substream of the off-gas stream can if necessary be enhanced by addition of a sorbent, in particular a calcium-containing sorbent.

In a preferred embodiment of the method according to the invention, it can be provided that the filter cake, in particular the fine fraction of the filter cake, is treated with water, and in particular mixed. The formation of a suspension thus achieved can simplify/enhance an introduction of the filter cake or a part thereof into the main stream of the off-gas stream by, for example, spraying. In addition, the development of an additive containing not only chlorine but also calcium can be achieved thereby, which can advantageously be provided for application of the method according to the invention for decreasing the sulphur content of the off-gas stream, since the filter cake of the substream of the off-gas stream can consist in a large part of calcium, at least when the method according to the invention is applied in the context of cement production. Additional incorporation of a calcium-containing additive into the off-gas stream can as a result be omitted or reduced.

Filtration of the substream of the off-gas stream can advantageously proceed by means of a wet separator, for example by means of a wet electrostatic precipitator. In wet separators, the off-gas temperature and the off-gas volume are lowered by spraying in water until the dew point is reached. As a result, in one method not only filtration of the substream of the off-gas stream, but also mixing of the filter cake with water to develop a suspension are permitted.

Mixing the filter cake with water further permits the aqueous filter cake again to be dewatered (that is to say to remove water present therein at least in part and preferably as completely as possible; e.g. by means of a vacuum belt drier or a filter press), in order to obtain therefrom firstly a first (at least partially) dewatered constituent and secondly chlorine-containing process water. This exploits the fact that chlorine and also alkali metals are readily water-soluble. The chlorine-containing process water can then be fed at least in part as chlorine-containing additive back to the main stream of the off-gas stream. As a result, further concentration of the chlorine can be achieved for introduction into the off-gas stream. Also, the process water may be advantageously introduced as a liquid into the main stream of the off-gas stream.

In particular when (inter alia) a decrease in the sulphur content of the off-gas stream is to be achieved by the method according to the invention, it can be provided that (again) a calcium-containing additive is added to the process water which is fed to the main stream of the off-gas stream, in order to permit or enhance the desired reaction of sulphur dioxide and/or sulphur trioxide to form calcium sulphite and/or calcium sulphate in the main stream of the off-gas stream.

In a further preferred embodiment of the method according to the invention, it can be provided that the dewatered constituent is mixed with the material. In an application of the method according to the invention in the context of cement production, the dewatered constituent can in particular be mixed with the kiln meal or added to the product in, for example, a cement mill.

It can additionally be provided that the dewatered constituent and/or the process water is subjected to a treatment for decreasing one or more constituents, in particular heavy metals (e.g. via a heavy metal precipitation), in order to make the off-gas and/or the material content of these constituents low.

In a further preferred embodiment of the method according to the invention, it can be provided to feed a cooling medium, for example fresh air, to the substream of the off-gas upstream of the filtration. This can achieve chlorine present in the substream of the off-gas stream being separated off and incorporated into particles entrained in the substream, which permits filtration thereof. Secondly, cooling the substream simplifies handling thereof.

BRIEF DESCRIPTION OF THE DRAWINGS

The invention will be described in more detail hereinafter with reference to an exemplary embodiment shown in the attached figures.

FIG. 1 is a schematic view of an exemplary method according to the invention and of a plant used in the method.

DETAILED DESCRIPTION

The following description of example methods and apparatus is not intended to limit the scope of the description to the precise form or forms detailed herein. Instead the following description is intended to be illustrative so that others may follow its teachings.

The plant shown schematically in FIG. 1 serves for producing cement clinker which can subsequently further be mixed with additives and be ground in a cement mill (not shown) to form cement.

For the production of cement clinker, raw materials 1 are ground in a raw mill 2. The raw meal thus generated is, after an admixture of additives (for example filter dust) and then designated kiln meal 3, optionally temporarily stored in a silo (not shown) and then fed to a preheater 4 in which it is preheated. The preheated kiln meal 3 is then transferred to a clinker kiln 5 which, for example, can be constructed as a rotary kiln furnace. In the clinker kiln 5, the kiln meal 3 is fired to form cement clinker 6. The off-gas liberated in the course of this (or a main stream 20 thereof) flows through the preheater 4 in countercurrent to the kiln meal 3 in order to preheat said kiln meal 3. Then the main stream 20 of the off-gas stream is conducted through a cooling tower 7 and/or the raw mill 2. In what is termed the direct operation, in which the raw mill 2 is not in operation and the kiln meal 3 is withdrawn from the silo, the main stream 20 of the off-gas stream is generally solely conducted via the cooling tower 7. In what is termed the compound operation, in contrast, at least a part of the main stream flows via the raw mill 2, in order to dry the raw materials 1.

The off-gas stream exiting from the cooling tower 7 and/or the raw mill 2 is then conducted through an off-gas filter 8 in order to dedust said off-gas stream, wherein also the harmful substance content is decreased.

The main stream 20 of the off-gas stream is cooled, owing to a transfer of heat energy to the kiln meal 3 in the preheater 4. As a result, chlorine which is still substantially present in the gaseous state in the clinker kiln 5 and in one or more lower stages of the preheater 4 that is designed, for example, as a multistage cyclone preheater, is separated off and incorporated into the kiln meal 3. Via the kiln meal 3, the chlorine then passes back into the clinker kiln 5. The chlorine circuit thus developed is relieved via an off-gas bypass 9.

The off-gas bypass 9 leaves in the region of the kiln intake, whereby a substream 10 of the off-gas stream conducted via the off-gas bypass 9, in the branch from the off-gas stream still has a temperature at which the chlorine is substantially gaseous and consequently also has not yet been separated and incorporated into the kiln meal 3.

The substream 10 of the off-gas stream that has been branched off is mixed with fresh air 11. The substream 10 is cooled thereby to the extent that a separation of the chlorine and optionally other harmful substances, for example alkali metals and mercury, and an incorporation of the chlorine, the alkali metals and the mercury in solid particles of dust entrained in the substream 10 of the off-gas stream occur. The dust consists essentially of particles (substantially already sintered kiln meal) that are entrained by means of the off-gas stream in the preheater 4 during passage. A substantial constituent of the kiln meal 3 and therefore of the dust is calcium.

The substream 10 of the off-gas stream is then conducted via a filter 12 in order to dedust said substream. The filter cake 13 produced in this case, because of the previously performed separation of the chlorine, the alkali metals and optionally the mercury, contains these harmful substances also.

The filtered substream 14 of the off-gas stream can be still further treated, further utilized and/or blown off into the atmosphere.

The filter cake 13 is fed via a treatment 15. In said treatment 15 it is mixed with water 16 and then dewatered. As a result, a dewatered constituent 17 and also a process water 18 are obtained, which process water also contains the majority of the input chlorine (because of the high water solubility of chlorine).

The dewatered constituent 17 can be reused and for this purpose can be applied, for example, together with the raw materials to the raw mill 2, or admixed to the finished product in a cement mill (not shown).

The chlorine-containing process water 18 is introduced at least in part after an optional addition of calcium hydroxide as additive, into the main stream 20 of the off-gas stream exiting from the preheater 4. A part of the process water 18 that is not utilized as chlorine-containing additive can, in contrast, be further treated, ejected from the process and disposed of.

An introduction of the process water 18 into the main stream 20 of the off-gas stream can proceed either upstream or else downstream of the raw mill 2 and the cooling tower 7. In the direct operation of the plant the process water 18 mixed with the calcium hydroxide (in a utilization as calcium-containing additive 19) proceeds in whole or in a large part upstream or downstream of the cooling tower 7. The sulphur dioxide and sulphur trioxide present in the main stream 20 of the off-gas reacts with the calcium of the calcium hydroxide to form calcium sulphite and calcium sulphate, which are then separated at the off-gas filter 8 of the plant. The chlorine that is introduced via the process water 18 into the main stream 20 of the off-gas stream, owing to the hygroscopic properties thereof, increases the degree of separation for sulphur. The same applies to the degree of separation for mercury, since an oxidation of elemental mercury to mercury chloride is effected, the tendency of which to absorption to solid particles is increased in comparison with elemental mercury.

In the compound operation of the plant, a partial introduction of the process water 18 (then optionally also without addition of calcium hydroxide 19) is provided upstream (in relation to the direction of flow of the main stream 20) of the raw mill 2. The chlorine content thus increased in the main stream 20 of the off-gas stream effects an additional (enhanced) separation of silver and mercury from the main stream 20 of the off-gas stream and an incorporation into the raw materials 1 in the context of the drying in the raw mill 2.

A filter cake 21 produced in the off-gas filter 8 is preferably ejected from the method at least in part. A chlorine circuit and/or mercury circuit in the process is thereby prevented or relieved.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method for decreasing an amount of a harmful substance of a chlorine-containing off-gas stream formed or used in a thermal treatment of a material, the method comprising:
   dividing the chlorine-containing off-gas stream into a main stream and a substream;
   afterwards, separating at least some chlorine from the main stream;
   afterwards, lowering an amount of the harmful substance in the main stream, wherein a chlorine-containing additive is introduced into the main stream to enhance separation of the harmful substance; and
   filtering the substream such that a filter cake is separated from the substream, wherein at least part of said filter cake is used as said chlorine-containing additive.

2. The method of claim 1 for decreasing an amount of sulphur content in the off-gas stream, the method further comprising:
   introducing a calcium-containing additive into the off-gas stream; and
   filtering off at least one of calcium sulphite or calcium sulphate from the off-gas stream,
   wherein a reaction of at least one of sulphur dioxide or sulphur trioxide in the off-gas stream forms at least one of calcium sulphite or calcium sulphate.

3. The method of claim 1 wherein the separation of the at least some chlorine from the main stream is caused by cooling the main stream during the thermal treatment of the material.

4. The method of claim 3 for decreasing an amount of sulphur content in the off-gas stream, the method further comprising:
   introducing a calcium-containing additive into the off-gas stream; and
   filtering off at least one of calcium sulphite or calcium sulphate from the off-gas stream,
   wherein a reaction of at least one of sulphur dioxide or sulphur trioxide in the off-gas stream forms at least one of calcium sulphite or calcium sulphate.

5. The method of claim 1 for decreasing an amount of mercury content in the off-gas stream, wherein a reaction involving mercury that forms mercury chloride is caused by:
   introducing the chlorine-containing additive; and
   filtering off the mercury chloride from the off-gas stream.

6. The method of claim 1 further comprising:
   separating the filter cake into a fine fraction and a coarse fraction; and
   feeding the fine fraction at least in part back to the main stream of the off-gas stream.

7. The method of claim 1 further comprising treating the filter cake at least in part with water.

8. The method of claim 7 further comprising:
   dewatering the filter cake to obtain a dewatered constituent and chlorine-containing process water; and
   feeding the chlorine-containing process water used as all or part of the chlorine-containing additive to the main stream of the off-gas stream.

9. The method of claim 8 further comprising mixing the dewatered constituent with the material.

10. The method of claim 8 further comprising adding a calcium-containing additive to the chlorine-containing process water that is fed to the main stream of the off-gas stream.

11. The method of claim 10 further comprising mixing the dewatered constituent with the material.

12. The method of claim 8 further comprising treating at least one of the dewatered constituent or the chlorine-containing process water to decrease, separate, and/or concentrate one or more constituents.

13. The method of claim 1 further comprising:
   introducing the chlorine-containing additive into the main stream of the off-gas stream at a point upstream of an off-gas filter; and discharging at least a portion of a filter cake produced in the off-gas filter.

14. The method of claim 1 further comprising:
firing kiln meal to form cement clinker; and
using the off-gas to be decreased with respect to the amount of the harmful substance to preheat the kiln meal, wherein the off-gas is formed during the firing of the cement clinker.

15. The method of claim 1 further comprising processing one or more raw materials to form kiln meal, wherein the off-gas to be decreased with respect to the amount of the harmful substance is used for drying the one or more raw materials.

* * * * *